United States Patent Office 3,450,574
Patented June 17, 1969

3,450,574
METHOD OF COATING REFRACTORY WARES WITH MAGNESIA
Phillip J. Read, Kanata, Ontario, Canada, assignor to Northern Electric Company Limited, Montreal, Quebec, Canada
No Drawing. Filed Nov. 14, 1966, Ser. No. 593,628
Int. Cl. C23c *17/02, 11/00;* C23f *17/00*
U.S. Cl. 148—6.3                                    5 Claims This invention relates to a method of manufacturing refractory coatings. In particular, it is concerned with a method of applying a thin layer of magnesia on a refractory body or substrate.

Magnesia has long been known as a coative material for refractory bodies, and a variety of methods have been proposed for applying the magnesia coating. However, the most satisfactory thin coating is obtained by coating a body with magnesia and heating the coated body to the sintering temperature of the magnesia, thus forming an adherent coating. This method has the serious disadvantage that it cannot be used to apply magnesia to a refractory body which is unstable at a temperature below the sintering temperature of magnesium. There has been a particular need for a very thin layer (one to five microns) of magnesia to protect refractory bodies intended for use with basic ceramic materials and specifically to prevent attack by lead oxide on siliceous or zirconia-bearing materials during the prepartions of lead zirconate titanate. In hot-pressing lead zirconate titanate, it is necessary to use split magnesia inserts as liners for the die in order to avoid reaction between the die material (titanium diboride, aluminum or stabilized zirconia) and the ceramic being treated. Thus, it is a particular objective of this invention to make a die having the high mechanical strength of the above mentioned materials and the inert quality of the inserts. It is a further specific objective to prepare siliceous refractory ware in a form not attacked by lead oxide. These objectives have been particularly difficult to meet with a magnesia coating since magnesium sinters at approximately 2400° C. and the known coating technique required the heating of both the coating and the substrate to this temperature.

The method of this invention overcomes the difficulties of the known coating techniques of applying a thin layer of magnesia to a refractory ware or substrate. According to the method of the invention, a thin film of magnesium metal is coated onto a refractory ware. The thus coated ware is then heated in a furnace in a nitrogen atmosphere to a temperature in the range of about 900 to about 1200° C. to convert the coating to a mixture of magnesium and the nitride thereof. Then, the atmosphere of the furnace is quickly changed from nitrogen to oxygen to cause a strongly exothermic reaction which evolves sufficient heat in the coating to sinter magnesia to the ware. The coating is raised to high temperatures of 2400° C. or more during sintering but the sintering stage is of very short duration and willl not normally raise the temperature of the ware or substrate being coated by more than about 40–50° C.

The magnesium metal can be coated onto the refractory ware by evaporation onto a previously cleaned refractory ware. The evaporation can be conveniently conducted at a temperature in the range of about 200 to 400° C. and a low pressure of less than $5 \times 10^{-5}$ torr. of an inert gas, such as argon or nitrogen. Sputtering can also be used to form the magnesium coating. It is also possible to paint on a compound which yields magnesium metal and volatile reducing gases when heated, e.g., a paint made from such compounds as Grignard's reagent or magnesium alkyls which are soluble in ether.

The method of this invention has the great advantage of providing the superior adherence of a sintered coating while permitting this coating to be applied to a refractory ware which itself is not capable of withstanding the sintering temperature. This method can be applied in any refractory process where ceramic materials are being treated to be protected against attack by highly basic materials. It also avoids the necessity of very expensive high temperature furnaces.

There is also the advantage that the layer of magnesia can be so thin (1 to 5 microns) that the difference in coefficients of thermal expansion between the refractory ware and the magnesia is immaterial. This is of great importance for such use as coating a die used in hot-pressing lead zirconate titanate since the die is constantly being heated and cooled.

Example

A film of magnesium metal 1–5 micron thickness was evaporated onto a previously cleaned alumina ceramic ware in a nitrogen atmosphere at a pressure of $3 \times 10^{-5}$ torr. The ware was maintained at about 400° C. during the evaporation to ensure good adhesion of the magnesium. Then, the ware was introduced into a furnace with a controllable atmosphere and heated to 1200° C. in nitrogen at atmospheric pressure. At this temperature the coating becomes a mixture of magnesium and its nitride and at this stage the furnace atmosphere was suddenly changed from nitrogen to oxygen. This sudden introduction of oxygen caused a strongly exothermic reaction which evolved enough heat to sinter the product of combustion, magnesia, to the ware. The furnace could then be cooled at any desired rate due to the superior adherence of the magnesia to the alumina refractory ware.

Equally good results were obtained when zirconia refractory ware and mullite tubes were coated with a thin layer of magnesia according to the method of the invention.

What I claim is:

1. A method of applying a thin layer of magnesia to a refractory ware which comprises applying a thin film of magnesium metal onto a refractory ware, heating the thus coated ware in a furnace in a nitrogen atmosphere to a temperature in the range of about 900 to about 1200° C. to convert the coating to a mixture of magnesium and the nitride thereof, and thereafter quickly changing the atmosphere in the furnace to oxygen to cause a strongly exothermic reaction which evolves sufficient heat in the coating to sinter the coating to the ware.

2. A method according to claim 1 wherein the layer of magnesia is 1 to 5 microns thick.

3. A method according to claim 1 wherein the film of magnesium metal is applied by evaporation in an inert atmosphere onto a previously cleaned refractory ware.

4. A method according to claim 1 wherein the refractory ware is aluminua.

5. A method according to claim 1 wherein the refractory ware is zirconia.

References Cited

UNITED STATES PATENTS

| | | | |
|---|---|---|---|
| 1,570,929 | 1/1926 | Udale et al. | 117—105.2 |
| 2,784,123 | 3/1957 | Rapparport | 148—6.3 |
| 3,155,534 | 11/1964 | Bruch | 117—118 X |
| 3,379,566 | 4/1968 | Hannam | 148—6.3 X |

RALPH S. KENDALL, *Primary Examiner.*

U.S. Cl. X.R.

117—123, 169, 62; 148—20.3